(12) United States Patent
Ishii et al.

(10) Patent No.: US 7,626,713 B2
(45) Date of Patent: Dec. 1, 2009

(54) IMAGE PROCESSING SYSTEM THAT REDUCES IMAGE UNEVENNESS

(75) Inventors: Akira Ishii, Ashigarakami-gun (JP); Masahiko Kubo, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 609 days.

(21) Appl. No.: 11/225,190

(22) Filed: Sep. 14, 2005

(65) Prior Publication Data
US 2006/0279790 A1 Dec. 14, 2006

(30) Foreign Application Priority Data
Jun. 10, 2005 (JP) ............................ 2005-171465

(51) Int. Cl.
*H04N 1/409* (2006.01)
(52) U.S. Cl. ........................ 358/1.1; 358/1.9; 358/406
(58) Field of Classification Search ................. 358/1.9, 358/1.1, 406, 504; 382/128, 100; 346/136, 346/134; 347/152, 112, 111
See application file for complete search history.

(56) References Cited

U.S. PATENT DOCUMENTS

| | | | | |
|---|---|---|---|---|
| 5,216,444 | A | * | 6/1993 | Noguchi et al. ............. 346/136 |
| 5,428,690 | A | * | 6/1995 | Bacus et al. ................ 382/128 |
| 5,510,896 | A | * | 4/1996 | Wafler ........................ 358/296 |
| 6,570,611 | B1 | | 5/2003 | Satou et al. |
| 6,600,504 | B2 | * | 7/2003 | Okugawa et al. ............. 347/152 |
| 2005/0094209 | A1 | * | 5/2005 | Hasler et al. ................. 358/2.1 |

FOREIGN PATENT DOCUMENTS

| CN | 1293807 | 5/2001 |
|---|---|---|
| JP | A 62-235972 | 10/1987 |
| JP | A 9-172543 | 6/1997 |
| JP | A 2001-189867 | 7/2001 |
| JP | A 2002-135610 | 5/2002 |
| JP | B2 3407399 | 3/2003 |

* cited by examiner

*Primary Examiner*—Thomas D Lee
(74) *Attorney, Agent, or Firm*—Oliff & Berridge, PLC

(57) ABSTRACT

The present invention provides an image processing apparatus including a first recognition component, a second recognition component and a conversion component. The first recognition component recognizes input side unevenness information representing unevenness of an image depending on an image inputting apparatus to which an image inputted and image data representing an image inputted to the image inputting apparatus. The second recognition component recognizes output side unevenness information representing unevenness of an image depending on an image outputting apparatus outputting based on the image data. The conversion component, based on the input side unevenness information recognized by the first recognition component and the output side unevenness information recognized by the second recognition component, corrects unevenness of images on both sides and converts the image data to a format processable by the image outputting apparatus at an output destination.

13 Claims, 6 Drawing Sheets

IMAGE PROCESSING SYSTEM THAT REDUCES IMAGE UNEVENESS

CROSS-REFERENCE TO RELATED APPLICATION

This application claims priority under 35USC 119 from Japanese Patent Application No. 2005-171465, the disclosure of which is incorporated by reference herein.

BACKGROUND OF THE INVENTION

1. Field of the Invention

The present invention relates to an image processing apparatus and an image processing system, and in particular, to an image processing apparatus preferable when used in an image processing system constructed by integrating various kinds of image inputting apparatuses and image outputting apparatuses and to an image processing system including the image processing apparatus.

2. Description of the Related Art

Various kinds of modes are conceivable as an image processing system equipped with an image inputting apparatus, an image processing apparatus and an image outputting apparatus. For example, a common digital copying machine is thought to be the simplest image processing system equipped with the apparatuses.

In a construction of an image processing system which is constructed in a single apparatus such as a digital copying machine, characteristics of each image inputting apparatus and each outputting apparatus (for example, unevenness characteristics such as color irregularity, a magnification and fineness depending on an image reading position and an image recording position) can be easily corrected by storing correction information obtained by measurement in advance, whereas in a case where an image processing system is constructed with an image inputting apparatus including a scanner reading an image, a communication apparatus receiving/transferring image data and a recording medium and the like; an image outputting apparatus such as the digital copying machine and a printer; a personal computer capable of various kinds of processing on image data, characteristics of the image inputting apparatus and the image outputting apparatus are different from each other which accumulates characteristics of the respective apparatuses when image data obtained from the image inputting apparatus is transferred to the image outputting apparatus, thereby exerting an adverse influence on a image quality.

SUMMARY OF THE INVENTION

The present invention has been made in view of the above circumstances and provides an image processing system.

A first aspect of the invention is an image processing apparatus. The apparatus includes: a first recognition component that recognizes input side unevenness information representing unevenness of an image depending on an image inputting apparatus to which the image is inputted and image data representing an image inputted to the image inputting apparatus; a second recognition component that recognizes output side unevenness information representing unevenness of an image depending on an image outputting apparatus performing output based on the image data; and a conversion component that, based on the input side unevenness information recognized by the first recognition component and the output side unevenness information recognized by the second recognition component, corrects unevenness of images on both sides and converts the image data to a format processable by the image outputting apparatus at an output destination of the image data.

A second aspect of the invention is an image processing system. The system includes: an image processing apparatus; an image inputting apparatus; and an image outputting apparatus. The image processing apparatus includes, a first recognition component that recognizes input side unevenness information representing unevenness of an image depending on the image inputting apparatus to which the image is inputted and image data representing an image inputted to the image inputting apparatus, a second recognition component that recognizes output side unevenness information representing unevenness of an image depending on the image outputting apparatus performing output based on the image data, and a conversion component that, based on the input side unevenness information recognized by the first recognition component and the output side unevenness information recognized by the second recognition component, corrects unevenness of images on both sides and converts the image data into a format processable by the image outputting apparatus at an output destination of the image data. The image inputting apparatus inputs an image and outputs the image data, and the image outputting apparatus outputs an image based on image data converted by the conversion component.

A third aspect of the invention is an image processing method. The method includes: (a) recognizing input side unevenness information representing unevenness of an image depending on an image inputting apparatus to which the image is inputted and image data representing an image inputted to the image inputting apparatus; (b) recognizing output side unevenness information representing unevenness of an image depending on an image outputting apparatus performing output based on the image data; and (c) correcting unevenness of images on both sides based on the input side unevenness information recognized in (a) and the output side unevenness information recognized in (b) and converting the image data to a format processable by the image outputting apparatus at an output destination.

BRIEF DESCRIPTION OF DRAWINGS

An embodiment of the present invention will be described in detail based on the following figures, wherein.

DETAILED DESCRIPTION OF THE INVENTION

Detailed description will be given of an example of embodiment of the present invention below with reference to the accompanying drawings.

Figure 1:
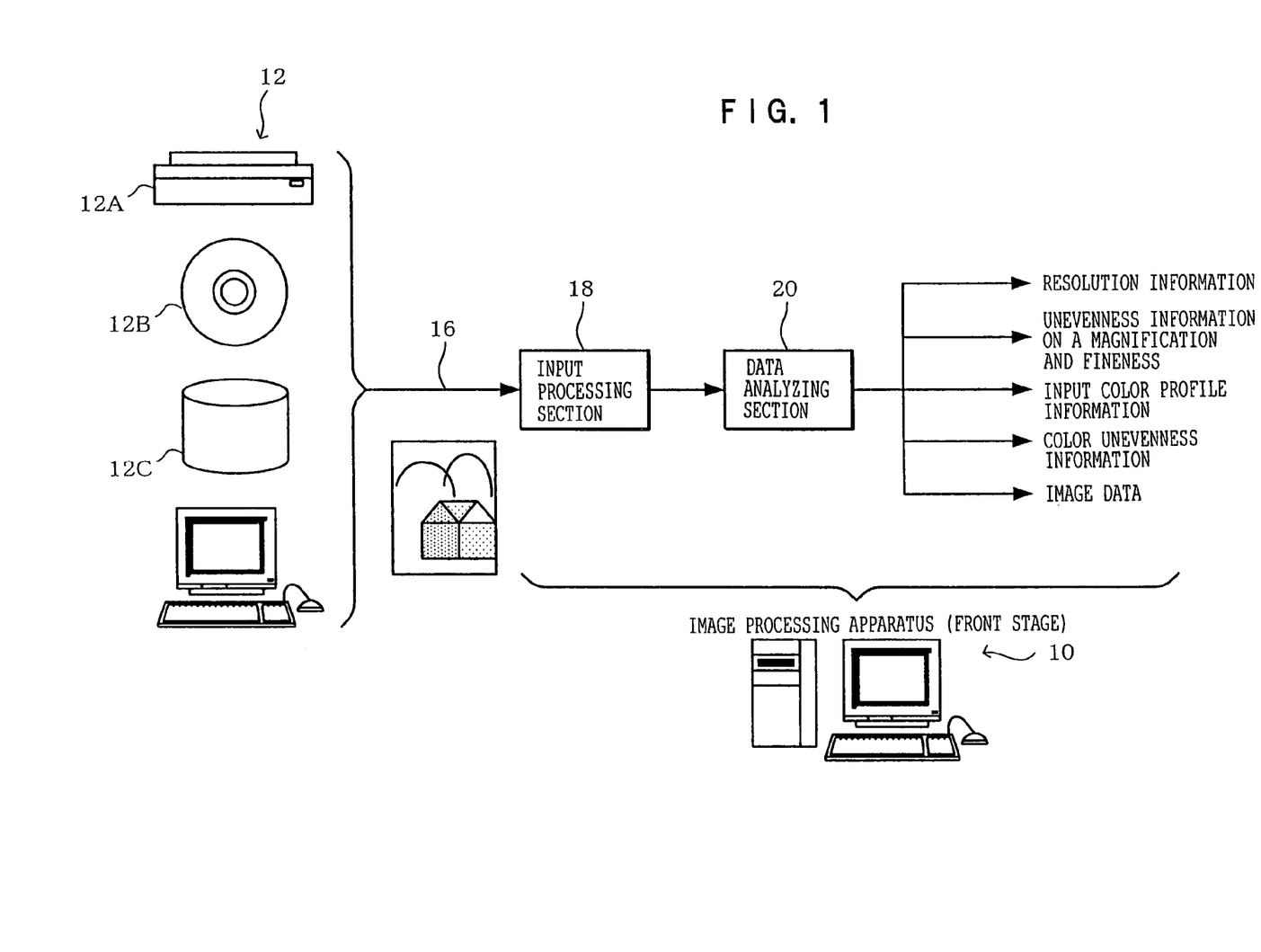
FIG. 1 is a block diagram showing a construction of the front stage of an image processing apparatus included an image processing system related to an embodiment of the invention.
Figure 2:
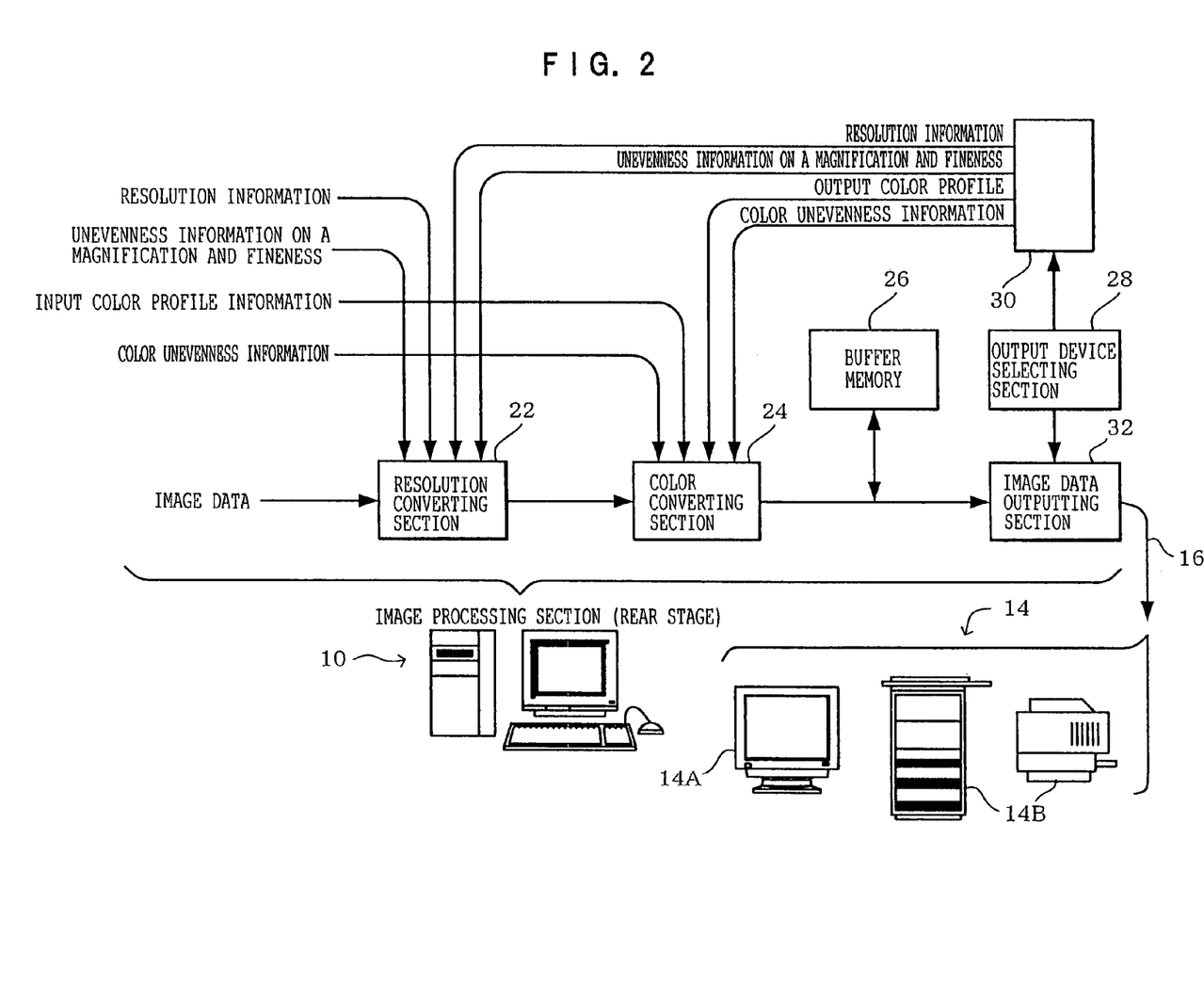
FIG. 2 is a block diagram showing a construction of the rear stage of the image processing apparatus included an image processing system related to the embodiment of the invention.

FIG. 1 is a block diagram showing a construction of the front stage of an image processing apparatus included an image processing system related to an embodiment of the invention and FIG. 2 is a block diagram showing a construction of the rear stage of the image processing apparatus included an image processing system related to the embodiment of the invention.

The image processing system is constructed of: plural image inputting apparatuses 12; an image processing apparatus 10; and plural image outputting apparatuses 14. Note that the image processing system may also have a construction in which a pair of an image inputting apparatus 12 and an image outputting apparatus 14 is connected to an image processing apparatus 10.

The image processing apparatus 10 is constituted of a computer including CPU, a memory, a hard disc, a keyboard, a display and the like. The image processing apparatus 10 receives image data or the like from the plural image inputting apparatuses 12 (for example, a scanner 12A, CD-ROM 12B, a data base 12C and the like) through a network 16 including LAN, public lines and others. The image processing apparatus 10 conducts processing described later on an inputted image data and supplies the image data after the processing to an image output apparatus 14 selected from the plural image output apparatuses 14 (for example, a display 14A, a printer 14B and the like) through the network 16 or the like. Thereby, image outputting (image display, image formation or the like) is conducted in the image outputting apparatus 14. Note that the network 16 corresponds to an input side communication component and an output side communication component of the invention.

In more detailed, the image processing apparatus 10 includes: an input processing section 18; a data analyzing section 20; a resolution converting section 22; a color converting section 24, a buffer memory 26; an output device selecting section 28; an output device information storage section 30; and an image data outputting section 32, and these processing blocks are realized by hardware or software.

The input processing section 18 spools inputted image data or the like into the hard disc when required and supplies the spooled image data or the like to the data analyzing section 20.

Description will now be given with regard to a format of image data or the like in the embodiment. The image data or the like in the embodiment is constituted of: resolution information (resolution of image data and the like); input color profile information (color information such as color space information and the like of image data); unevenness information (unevenness information on a magnification and fineness, color unevenness information and others); image data (for example, gradation map data and others); and other data. Image data obtained by integrating image data described above is referred to as integrated image data.

The data analyzing section 20, when integrated image data is supplied from the input processing section 18, analyses the integrated image data, divides the data into the resolution information, the input color profile information, the unevenness information and image data, outputs the resolution information, the unevenness information on a magnification and fineness, and the image data to the resolution converting section 22 and outputs the color profile information and color unevenness information to the color converting section 24. Note that the data analyzing section 20 corresponds to the first recognition component.

An output device information storage section 30 stores resolution information, unevenness information on a magnification and fineness, output color profile information, and color unevenness information of each of the image outputting apparatuses 14, and an output device selecting section 28 outputs an image output selecting signal SEL1 selecting one of the image outputting apparatuses 14 based on a command by a user (or by another computer issuing a print request of the image data) to the output device information storage section 30 and an image data outputting section 32.

Thereby, the output device information storage section 30 selects resolution information, unevenness information on a magnification and fineness, an output color profile, and color unevenness information corresponding to the image output selecting signal SEL1, outputs the resolution information and unevenness information on a magnification and fineness to the resolution converting section 22 and outputs the output color profile and the color unevenness information to the color converting section 24.

Note that the output device selecting section 28 and the output device information storage section 30 corresponds to the second recognition component of the invention.

The image data outputting section 32 outputs image data processed in the image processing apparatus 10 to the image outputting apparatus 14 corresponding to an image output selecting signal SEL1.

The resolution converting section 22 converts resolution of image data inputted from the image inputting apparatus 12 to a resolution processable by the image outputting apparatus 14. The color converting section 24 converts a color space of image data inputted from the image inputting apparatus 12 to a color space processable by the image outputting apparatus 14. Note that the resolution converting section 22 and the color converting section 24 correspond to the conversion component of the invention.

To be detailed, the resolution converting section 22, when being supplied with resolution data including input image data, and resolution information and an output image expansion/contraction magnification of the image outputting apparatuses 14, calculates a data expansion/contraction rate based on the equation (1) given below. The term "an output image expansion/contraction magnification" is an apparent expansion/contraction rate designated by a user. Note that an image expansion/contraction magnification is explained as information included in resolution information in the embodiment.

$$\text{Data expansion/contraction rate} = (\text{output image expansion/contraction magnification} \times \text{a resolution of image outputting apparatus})/\text{a resolution of input image data} \quad (1)$$

As an example, if a resolution of input image data is 12(dpm, or dot/mm), a resolution of the image outputting apparatus is 24 (dpm) and an output image expansion/contraction magnification is 100%, a data expansion/contraction rate is 200%. That is, input image data is expanded by the resolution converting section 22 twofold in terms of pixel units (an area increases fourfold).

Description will be given here of the concrete contents of processing executed in the resolution converting section 22 in order to realize the processing according to the equation (1).

To begin with, it is arranged in a way described below: Ii indicates an input image file and Io indicates an output image file. When a data size of the input image file Ii is indicated by (Xi, Yi) and a data expansion/contraction rate is indicated by m, a data detail (Xo, Yo) is determined by the equations (2) and (3) given below. In the embodiment, figures below the decimals are omitted.

$$Xo = mXi \quad (2)$$

$$Yo = mYi \quad (3)$$

If it is assumed that an input image file Ii and an output image file Io are developed on the same rectangle, pitches between pixels of the two do not coincide with each other since the data sizes thereof are different from each other. Therefore, each of pixels of the output image file Io are surrounded with 4 pixels of the input image file Ii. By applying interpolation over densities of the 4 pixels, an image density of the output image file Io can be obtained.

The resolution converting section 22 of the embodiment, on this occasion, obtains an output image file Io corrected with respect to unevenness of image based on unevenness information on magnification and fineness outputted from the data analyzing section 20 and unevenness information on a magnification and fineness stored in the output device information storage section 30. Thereby, correction can be made on unevenness of the image inputting apparatus 12 and the image outputting apparatus 14.

Note that a construction may be adopted in which unevenness information on a magnification and fineness of the image inputting apparatuses 12 is measured each time when being produced by each image inputting apparatus 12 and stored in advance and attaches the unevenness information to the header or the like of image data when the image data is outputted, while another construction may be adopted in which data for correcting unevenness of a magnification and fineness is stored in the image processing apparatus 10 when the image inputting apparatus 12 is connected to the image processing apparatus 10 (for example, a driver of the image inputting apparatus 12 is installed) and identification information for selecting stored data is attached to the header or the like of image data as unevenness information to thereby read corresponding correction data. A construction may be adopted in which unevenness information on a magnification and fineness of the image outputting apparatuses 14 is measured and stored in advance when being produced by each image outputting apparatus 14 and the unevenness information is transmitted to the image processing apparatus 10 when required and thereby stored into the output device information storage section 30, while another construction may be adopted in which data for correcting unevenness of a magnification and fineness is, when the image outputting apparatus 14 is connected to the image processing apparatus 10 (for example, a driver of the image outputting apparatus 14 is installed) stored into the output device information storage section 30 in advance as unevenness information. A construction may be adopted in which unevenness information on a magnification and fineness is, when being stored, stored into the output device information storage section 30 through the network 16, while another construction may also be adopted in which unevenness information is stored through various kinds of storage media (for example, a flexible disk, CD-ROM, DVD and the like).

On the other hand, the color converting section 24 conducts color conversion on image data a resolution of which has been converted by the resolution converting section 22. To be detailed, not only is color information outputted from the data analyzing section 20 converted into three attributes L*a*b* but the image data that has been converted to L*a*b* based on an output color profile outputted by the output device information storage section 30 is converted to a color space that is processable by the image outputting apparatus (for example, CMYK and the like) and results of the conversion is stored into the buffer memory 26.

In the color converting section 24, on this occasion, not only is color unevenness corrected based on color unevenness information of the image inputting apparatus 12 outputted from the data analyzing section 20, but color unevenness is also corrected based on a color unevenness information of the image outputting apparatus outputted from the output device information storage section 30.

Note that a construction may be adopted in which color unevenness information of the image inputting apparatuses 12 is measured when being produced by each image inputting apparatus 12 and stored in advance and attached to the header or the like of image data when the image data is outputted, while another construction may also adopted in which data for correcting color unevenness information is, when the image inputting apparatus 12 is connected to the image processing apparatus 10 (for example, a driver of the image inputting apparatus 12 is installed), stored into the image processing apparatus 10 and identification information for selecting the stored data is attached to the header or the like of image data as unevenness information to thereby read corresponding correction data. A construction may be adopted in which color unevenness information of the image outputting apparatuses 14 is measured when being produced by each image outputting apparatus 14, stored in advance, transmitted to the image processing apparatus 10 when required and thereby stored into the output device storage section 30, while another construction may also be adopted in which data for correcting color unevenness is, when the image outputting apparatus 14 is connected to the image processing apparatus 10 (for example, a driver of the image outputting apparatus 14 is installed), stored into the output device information storage section 30 as the unevenness information in advance.

Description will be given here of a determination method for a conversion characteristic of the color converting section 24.

Figure 3:
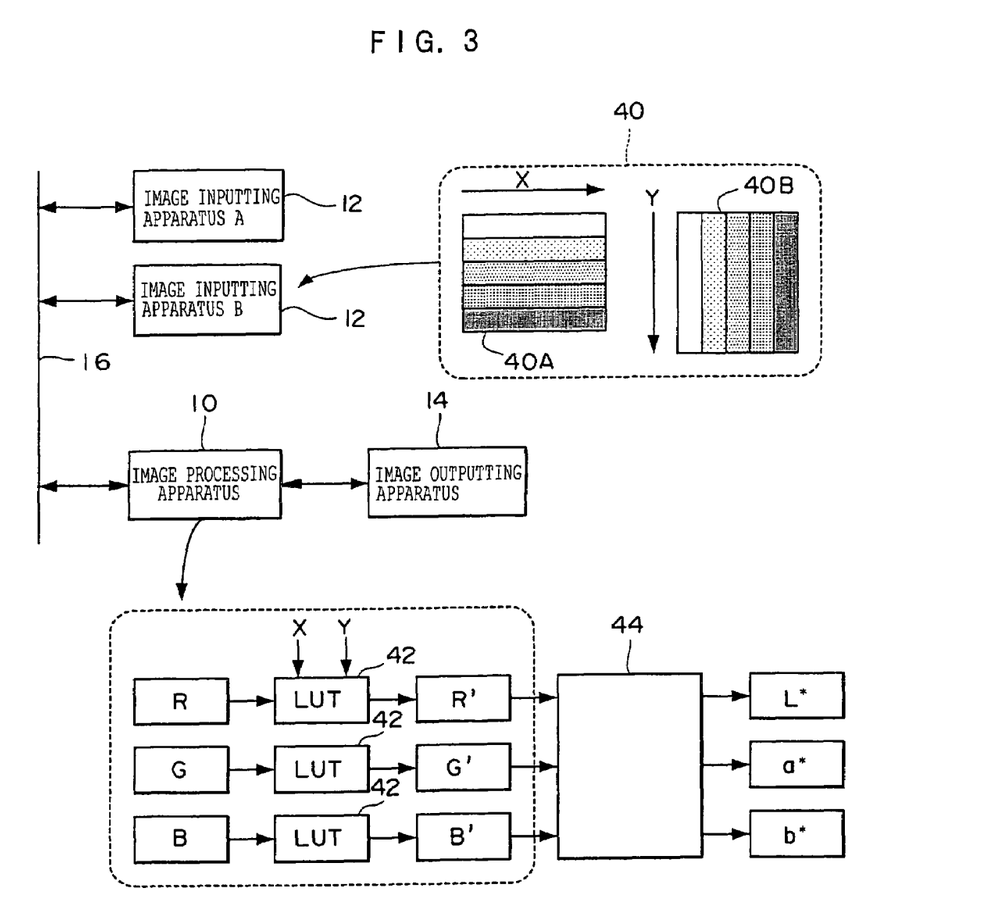
FIG. 3 is a block diagram for describing a determination method for a conversion characteristic of a color converting section on the side of the image inputting apparatus in an image processing apparatus related to the embodiment of the invention.
Figure 4:
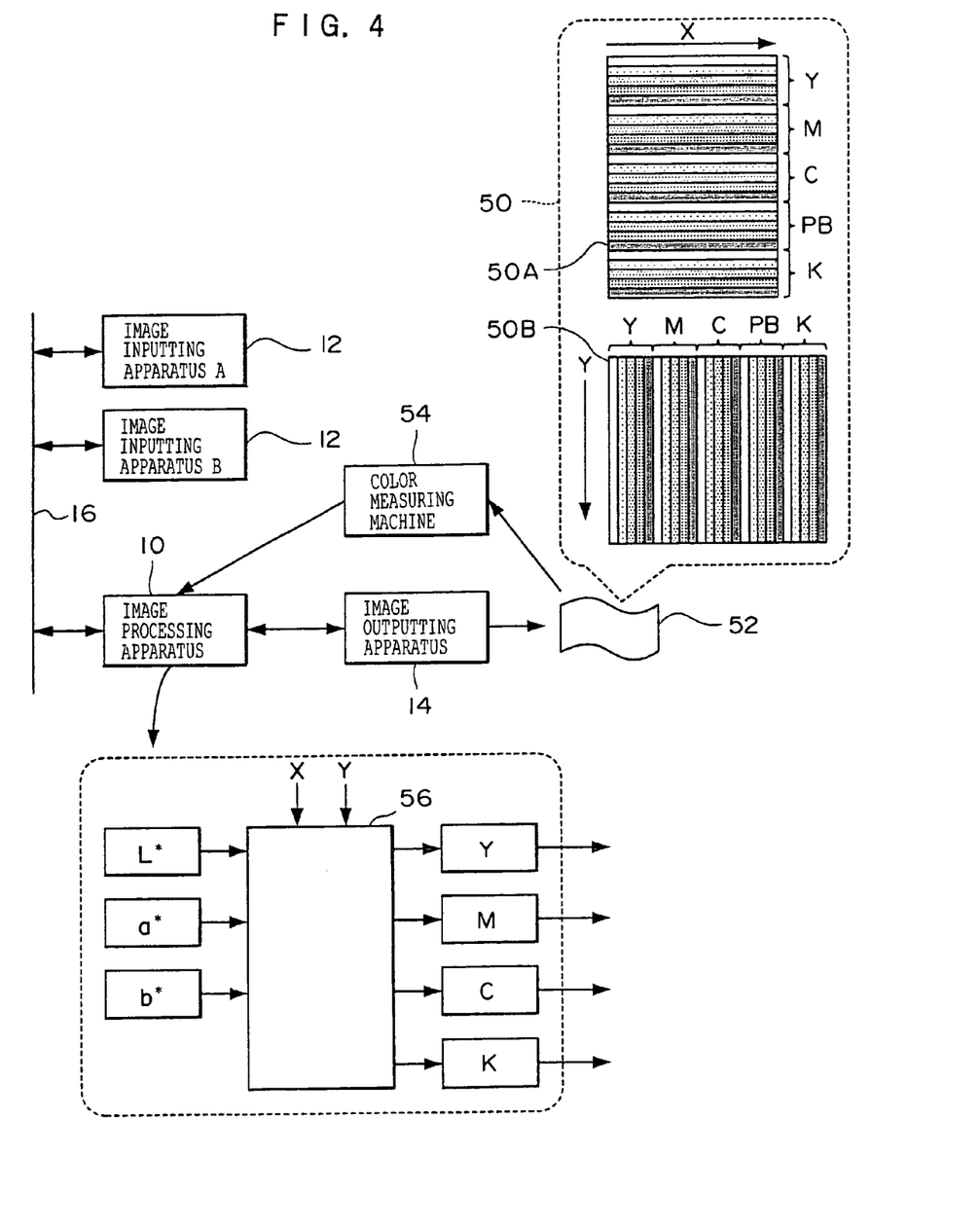
FIG. 4 is a block diagram for describing a determination method for a conversion characteristic of a color converting section on the side of the image outputting apparatus in an image processing apparatus related to the embodiment of the invention.

FIG. 3 is a block diagram for describing a determination method for a conversion characteristic of the color converting section 24 on the side of an image inputting apparatus 12 in an image processing apparatus 10 related to the embodiment of the invention and FIG. 4 is a block diagram for describing a determination method for a conversion characteristic of a color converting section 24 on the side of an image outputting apparatus 14 in an image processing apparatus 10 related to the embodiment of the invention.

Firstly, description will be given of a determination method for a conversion characteristic of the color conversion section 24 on the side of the image inputting apparatus 12.

To begin with, in the image inputting apparatus 12, a standard image 40 of a standard chart or the like whose L*a*b* or RGB values are known, such as shown in FIG. 3, is read, and not only is image data obtained by this reading transmitted to the image processing apparatus 10, but known data of the standard image 40 is also transmitted to the image processing apparatus 10. Note that in the embodiment, a standard image 40A in which band images each having the same density in the main scan direction X are arranged in parallel with each other such that densities thereof differ in the sub scan direction Y from top to bottom while a standard image 40B in which band images each having the same density in the sub scan direction Y are arranged in parallel with each other such that densities thereof differ in the main scan direction X from left to right and in the description, the values of RGB of the standard 40 that was used are handled as an example with known RGB values.

In the image processing apparatus 10, values of an LUT (Look UP Table) 42 as a conversion characteristic are determined so that RGB image data obtained by reading an image with the image inputting apparatus 12 at each of positions in the main scan direction X and the sub scan direction Y and known data (R', B', G') coincide with each other. That is, by determining the conversion characteristic in this way, color unevenness depending on reading positions of the image inputting apparatus 12 can be corrected.

In the color conversion section 24, data in terms of R'G'B' having been corrected with respect to color unevenness is converted to color data in terms of L*a*b* using a known Matrix operation, DLUT color conversion 44 or the like.

On the other hand, a determination method for a conversion characteristic of the color converting section 24 on the side of the image outputting apparatus 14 is such that to begin with, values of L*a*b* as shown in FIG. 4 outputs the known image 50 in the image output apparatus 14. The standard image 50 is recorded on recording media 52 such as paper sheets, in each color of Y, M, C, PK (process black prepared only with YMC) in the image output apparatus 14, as shown in FIG. 4, as a standard image 50A in which band images each having the same density in the main scan direction X are arranged in parallel with each other such that densities thereof differ in the sub scan direction Y from top to bottom and as a standard image 50B in which band images each having the same density in the sub scan direction Y are arranged in parallel with each other such that densities thereof differ in the main scan direction X from left to right.

Not only is known data of the standard image 50 inputted to the image processing apparatus 10, but a recording medium 52 on which the standard image 50 is recorded is also measured with a color measuring machine 54, the measured values are inputted into the image processing apparatus 10 and a conversion characteristic such as Matrix operation or DLUT color conversion 56 is determined by the image processing apparatus 10 so that YMCK expected from data in terms of L*a*b* obtained by measuring the color measuring machine 54 at each of positions in the main scan direction X and the sub scan direction Y with the color measuring machine 54 and known data (L*a*b*) coincide with each other. That is, by determining the conversion characteristic in this way, color unevenness depending on recording positions of the image outputting apparatus 14 can be corrected.

Conversion characteristics of the image inputting apparatus 12 and the image outputting apparatus 14 can be determined, for example, when the image inputting apparatus 12 and the image outputting apparatus 14 are connected to the image processing apparatus 10; and the determined conversion characteristics are stored into a memory of the image processing apparatus 10, the output device information storage section 30 or the like in correspondence to color information or color unevenness information attached to image data, and a corresponding conversion characteristic is read to the color converting section 24 using color information and color unevenness information when the image data is processed, thereby enabling unevenness of an image to be corrected, while a conversion characteristic of the color converting section 24 on the side of the image inputting apparatus 12 may be attached to the image data with the conversion characteristic itself as unevenness information.

Note that in the embodiment, the measured color values obtained by measuring the standard image 50 recorded in the recording medium 52 using the color measuring machine 54 are used when the conversion characteristic on the side of the image outputting apparatus 14 is determined as described above, while the standard image 50 recorded on the recording medium 52 is read using the image inputting apparatus 12 such as the scanner 12A instead of the color measuring machine 54 and the image data obtained by the reading may be used.

Figure 5:
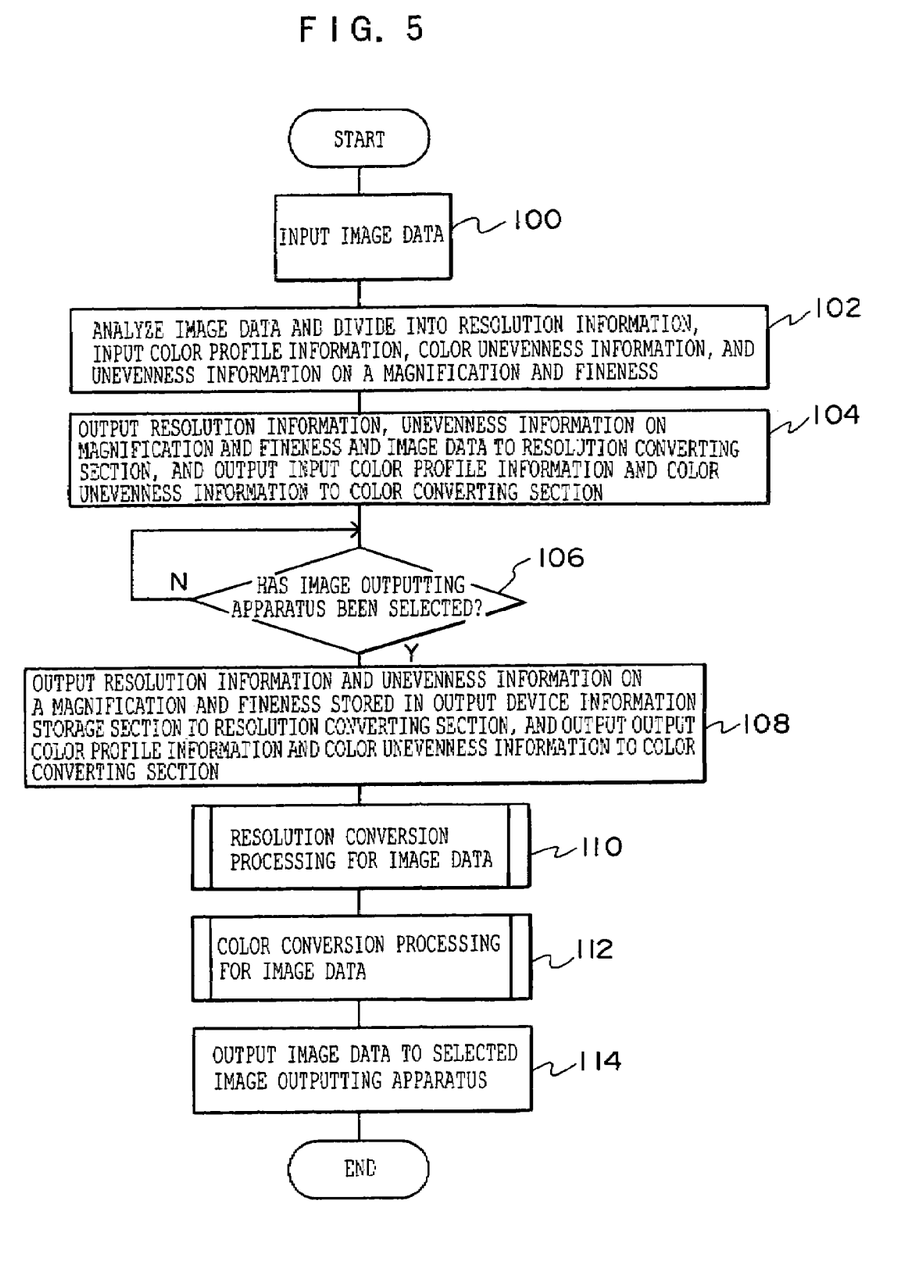
FIG. 5 is a flowchart showing an example flow of operations in an image processing apparatus related to the embodiment of the invention.

Then, description will be given of an example of operations in the image processing apparatus 10 that is constructed described above. FIG. 5 is a flowchart showing an example flow of operations in the image processing apparatus 10 related to the embodiment of the invention.

To begin with, in step 100, image data is inputted. For example, the image inputting apparatus 12 and the image processing apparatus 10 are operated by a user and thereby image data is inputted to the image processing apparatus 10 from the image inputting apparatus 12.

Then, in step 102, the image data is analyzed by the data analyzing section 20 and divided into resolution information, input color profile information, color unevenness information, and information on a magnification and fineness and the process advances to step 104, where not only are the resolution information, the unevenness information on a magnification and fineness and the image data outputted to the resolution converting section 22, but the input color profile information and the color unevenness information are also outputted to the color converting section 24. Thereby, in the resolution converting section 22, correction data for correcting unevenness such as a magnification and fineness of the image inputting apparatus 12 using unevenness information such as unevenness information on a magnification and fineness, while in the color converting section 24, the conversion characteristics corresponding to the input color profile information and the color unevenness information can be read using the input color profile information and the color unevenness information.

In step 106, it is determined in the image processing apparatus 10 whether or not an image outputting apparatus 14 outputting the image data has been selected. The determination is achieved by determining whether or not an image outputting apparatus 14 has been selected with the image processing apparatus 10 operated by a user, and if the determination is negative, the process waits until the determination becomes affirmative. If the determination is affirmative, the process advances to step 108.

In step 108, not only are the resolution information and unevenness information on a magnification and fineness, stored in the output device information storage section 30, and corresponding to the selected image outputting apparatus 14 outputted to the resolution converting section 22, but the output color profile information and the color unevenness information corresponding to the selected image outputting apparatus 14 are also outputted to the color converting section 24.

In step 110, resolution conversion processing is performed by the resolution converting section 22. That is, the processing in the resolution converting section 22 is performed based on the resolution information on the image inputting apparatus 12 side and the resolution information on the image outputting apparatus 14 side. In the processing, correction is made on unevenness of a magnification and fineness.

In step 112, color conversion processing is performed by the color converting section 24. That is, conversion characteristics corresponding to input color profile information and color unevenness information on the image inputting apparatus 12 side are read and for example, image data in terms of RGB is converted in color to image data in terms of L*a*b* using the conversion characteristics. Then, conversion characteristics corresponding to output color profile information and color unevenness information on the image outputting apparatus 14 side are read and image data converted to L*a*b* using the conversion characteristics is converted in color to image data, for example, in terms of CMYK.

In step 114, an image data which is processed as described above to the selected image outputting apparatus 14 in the image processing apparatus 10, is outputted.

In the embodiment, since, in this way, not only is the unevenness depending on the image inputting apparatus 12 corrected, but the unevenness depending on the image outputting apparatus 14 is also corrected, the unevenness of the image inputting apparatus 12 and the image outputting apparatus 14 can be corrected in a single integrated way, thereby enabling precision of image evenness to be bettered. Besides, the corrections in the single integrated way make it possible to cope with reception/transfer of image data between different equipment. Even in a inexpensive image inputting apparatus 12 poor in unevenness, a high precision output image can be obtained by performing correction through the image processing apparatus 10 related to the embodiment.

In the embodiment, since color conversion is performed through a color space (L*a*b*) not depending on a device when a color conversion processing is conducted in the color converting section 24, unevenness concerning color of the image inputting apparatus 12 and the image outputting apparatus 14 can be conducted in a single integrated way.

Figure 6:
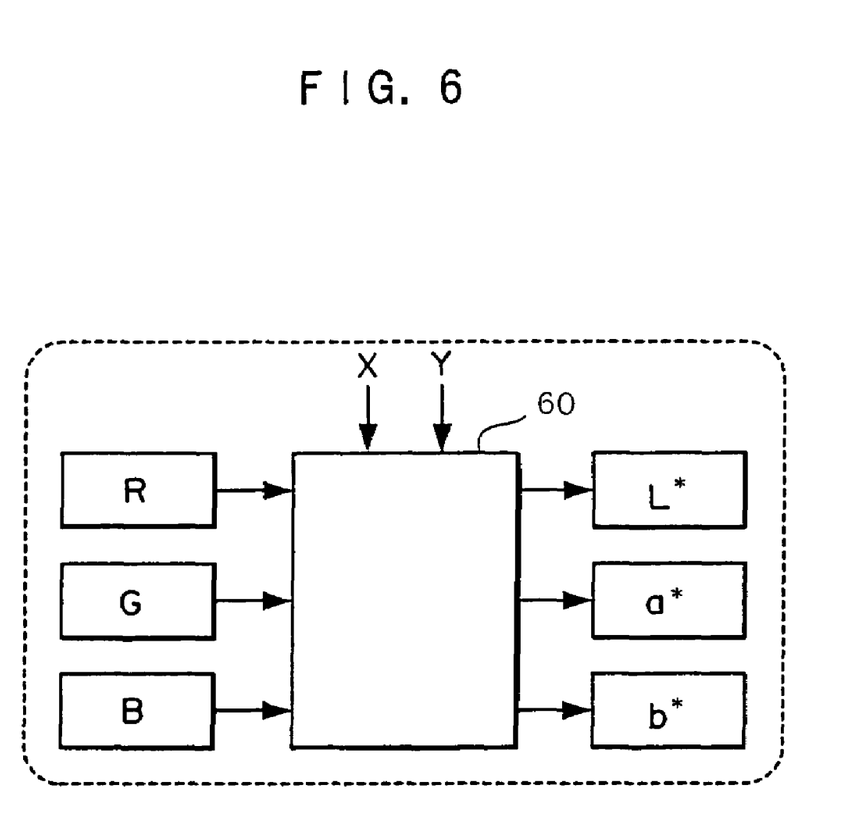
FIG. 6 is a block diagram showing an example of conversion characteristic of a color converting section on the side of the image inputting apparatus in an image processing apparatus related to the embodiment of the invention.

Note that in the embodiment, values of the LUT (Look Up Table) 42 are determined in a determination method for a conversion characteristic of a color converting section 24 for the image inputting apparatus 12 so that RGB image data and known data (R', B', G') coincide with each other at each position in the main scan direction X and the sub scan direction Y to thereby convert the image data to color data in terms of L*a*b*, to which the determination method is not limited, and, for example, as shown in FIG. 6, the Matrix operation or DLUT color conversion 60 may be determined so that RGB image data at each position in the main scan direction X and the sub scan direction Y are L*a*b* as known data.

In the embodiment, determination of a conversion characteristic is performed in the image processing apparatus 10 in a determination method for a conversion characteristic of the color converting section 24 for the image inputting apparatus 12, to which the determination is not limited, and a construction may be adopted in which a conversion characteristic is determined in the image inputting apparatus 12 side in advance and the conversion characteristic is inputted to the image processing apparatus 10 through the network 16 or various kinds of storage media (for example, a flexible disc, CD-ROM, DVD and the like).

In the embodiment, determination of a conversion characteristic is performed in the image processing apparatus 10 in a determination method for a conversion characteristic of the color converting section 24 for the image outputting apparatus 14, to which the determination is not limited, and a construction may be adopted in which a conversion characteristic is determined in the image outputting apparatus 14 side in advance and the conversion characteristic is stored into the image processing apparatus 10 through the network 16 or various kinds of storage media (for example, a flexible disc, CD-ROM, DVD and the like).

In the embodiment, the color measuring machine 54 used in determination of the conversion characteristic of the color converting section 24 for the image outputting apparatus 14 is installed separately from the image outputting apparatus 14. However, the construction is not limited thereto, and a construction may be adopted in which the color measuring machine 54 is built in the image outputting apparatus 14.

In the embodiment, unevenness of a magnification and fineness is corrected by the resolution converting section 22 and color unevenness is corrected in the color converting section 24, to which a construction is not limited, and only one of the unevenness may be corrected. A space frequency characteristic may be corrected in addition to correction of unevenness of a magnification and fineness and correction of color unevenness while correction may be made on at least one selected from the group consisting of correction of the unevenness of a magnification and fineness, correction of the color unevenness and correction of the space frequency characteristic.

An image inputting apparatus such as a scanner has a read image strain and image extension and shrinkage and an image outputting apparatus such as a printer also has an image strain such as a magnification error and image skew. In a case where the image strains occur constantly, unevenness information can be grasped through reading and outputting of a reference image; therefore, the image strains can be dealt with in a similar way to that of unevenness information in the embodiment. In the case of an image strain, it is more effective to make correction integrally using resolution conversion processing for the image outputting apparatus than a way that an input image and an output image are individually corrected. In the embodiment, by controlling unevenness information integrally in the image processing apparatus 10, effectiveness can be exerted for any of combinations in connection among the plural image inputting apparatuses 12 and the plural image outputting apparatuses 14.

The first aspect of the invention, as described above, is an image processing apparatus. The apparatus includes: a first recognition component that recognizes input side unevenness information representing unevenness of an image depending on an image inputting apparatus to which the image is inputted and image data representing an image inputted to the image inputting apparatus; a second recognition component that recognizes output side unevenness information representing unevenness of an image depending on an image outputting apparatus performing output based on the image data; and a conversion component that, based on the input side unevenness information recognized by the first recognition component and the output side unevenness information recognized by the second recognition component, corrects unevenness of images on both sides and converts the image data to a format processable by the image outputting apparatus at an output destination of the image data.

According to the first aspect, the first recognition component recognizes the input side unevenness information expressing unevenness of an image depending on the image inputting apparatus to which an image is inputted, and the image data expressing an image inputted to the image inputting apparatus. For example, as the input side unevenness information, applicable are unevenness information such as unevenness of a magnification and fineness, color unevenness and unevenness of a space frequency of the inputting apparatus.

The second recognition component recognizes the output side unevenness information expressing unevenness of an image depending on the image outputting apparatus from which output based on the image data is conducted. For example, as the output side unevenness information, unevenness information such as unevenness of a magnification and fineness, color unevenness, and unevenness of a space frequency of the outputting apparatus can be applied, similarly as in the input side unevenness.

In the conversion component, unevenness of both images is corrected based on the input side unevenness information recognized by the first recognition component and the output side unevenness information recognized by the second recognition component and the image data is converted to a format processable by the image outputting apparatus at an output destination of the image data. For example, the conversion component corrects unevenness information such as unevenness of a magnification and fineness, color unevenness and unevenness of a space frequency to thereby convert a resolution, a color and the like to a format processable by the image outputting apparatus at the output destination.

By correcting unevenness of an image based on the input side unevenness information and the output side unevenness information to thereby convert the image data to a format processable by an apparatus at the output destination when conversion is conducted in the conversion component, unevenness of an image depending on the image inputting apparatus and unevenness of the image depending on the image outputting apparatus can be corrected in a single integrated way.

Note that the invention may be configured such that information obtained by comparing color information when a predetermined reference image is read by the image inputting apparatus with a reference value of the reference image is applied as the input side unevenness information.

The first recognition component may recognize by acquiring input side unevenness information through an input side communication component for communicating with the image inputting apparatus or recording media.

Image data recognized by the first recognition component may be constituted of data attached with input side unevenness information or identification information for identifying the input side unevenness information.

An output side unevenness information can be replaced with information obtained by comparison of a measured color value obtained by measuring a color of a predetermined reference image outputted by the image outputting apparatus with a reference value of the reference image, while an output side unevenness information can be replaced with information obtained by comparison of color information obtained by reading a predetermined reference image outputted by the image outputting apparatus, using the image inputting apparatus, with a reference value of the reference image.

The image outputting apparatus may be replaced with an image outputting apparatus in which a color measuring machine measuring an image in color is built.

The second recognition component may be recognized by acquiring output side unevenness information through an output side communication component for communicating with the image outputting apparatus or through a recording medium.

An output side unevenness information may be replaced with an output side unevenness information produced by the image outputting apparatus.

An input side unevenness information and an output side unevenness information may include at least one selected from the group consisting of color unevenness information, unevenness information on a magnification and fineness, unevenness information on a space frequency.

According to the invention, as described above, an effect is achieved in which by correcting an unevenness of an image based on the input side unevenness information and the output side unevenness information to thereby convert the image data to a format processable by an image outputting apparatus at the output destination when the image data is converted to the format processable by the image outputting apparatus at the output destination, unevenness depending on an inputting/outputting apparatus can be corrected in a single integrated way in an image processing apparatus to which an image inputting apparatus and an image outputting apparatus are individually connected.

What is claimed is:

1. An image processing apparatus comprising:
   a first recognition component that recognizes input side unevenness information of an image inputting apparatus;
   a second recognition component that recognizes output side unevenness information of an image outputting apparatus; and
   a conversion component that simultaneously corrects image unevenness based on both the input and output side unevenness information and converts image data corresponding to an input image to a format processable by the image outputting apparatus at an output destination.

2. The image processing apparatus of claim 1, wherein the input side unevenness information is obtained by comparing a reference value of a predetermined reference image with color information of an image inputting apparatus output that corresponds to the reference image.

3. The image processing apparatus of claim 1, wherein the first recognition component acquires the input side unevenness information either through an input side communication component for communicating with the image inputting apparatus, or from a recording medium.

4. The image processing apparatus of claim 1, wherein image data processed by the first recognition component includes the input side unevenness information or identification information for identifying the input side unevenness information.

5. The image processing apparatus of claim 1, wherein the output side unevenness information includes information obtained by comparing a reference value of a predetermined reference image with a measured color value obtained by measuring a color of the reference image outputted by the image outputting apparatus.

6. The image processing apparatus of claim 5, wherein the image outputting apparatus includes a color measuring machine that measures color of an image outputted therefrom.

7. The image processing apparatus of claim 5, wherein the output side unevenness information is produced by the image outputting apparatus.

8. The image processing apparatus of claim 1, wherein the output side unevenness information is information obtained by comparing a reference value of a predetermined reference image with color information obtained by using the image inputting apparatus to read a the reference image outputted by the image outputting apparatus.

9. The image processing apparatus of claim 8, wherein the output side unevenness information is produced by the image outputting apparatus.

10. The image processing apparatus of claim 1, wherein the second recognition component acquires the output side unevenness information either through an output side communication component for communicating with the image outputting apparatus, or from a recording medium.

11. The image processing apparatus of claim 1, wherein the input side unevenness information and the output side unevenness information include at least one of color unevenness information, unevenness information on a magnification and fineness, and unevenness information on a spatial frequency.

12. An image processing system comprising:
an image processing apparatus;
an image inputting apparatus; and
an image outputting apparatus,
wherein the image processing apparatus includes,
a first recognition component that recognizes input side unevenness information of the image inputting apparatus,
a second recognition component that recognizes output side unevenness information of the image outputting apparatus, and
a conversion component that simultaneously corrects image unevenness based on both the input and output side unevenness information and converts image data corresponding to an input image to format processable by the image outputting apparatus at an output destination,
the image inputting apparatus inputs the input image and outputs the image data, and
the image outputting apparatus outputs an image based on image data converted by the conversion component.

13. An image processing method comprising:
(a) recognizing input side unevenness information of an image inputting apparatus;
(b) recognizing output side unevenness information of an image outputting apparatus; and
(c) simultaneously correcting image unevenness based on both the input side unevenness information recognized in (a) and the output side unevenness information recognized in (b); and
converting image data corresponding to an input image to a format processable by the image outputting apparatus at an output destination.

* * * * *